United States Patent [19]

Tezuka

[11] Patent Number: 5,033,329
[45] Date of Patent: Jul. 23, 1991

[54] SYSTEM FOR CONTROLLING DISTRIBUTION OF TORQUE TO LEFT AND RIGHT WHEELS OF A MOTOR VEHICLE

[75] Inventor: Kazunari Tezuka, Niiza, Japan

[73] Assignee: Fuji Jukogyo Kabushiki Kaisha, Tokyo, Japan

[21] Appl. No.: 562,488

[22] Filed: Aug. 3, 1990

[30] Foreign Application Priority Data

Aug. 31, 1989 [JP] Japan .................................. 1-225251

[51] Int. Cl.$^5$ ............................................. B60K 41/04
[52] U.S. Cl. .......................................... 74/866; 475/150
[58] Field of Search .................... 475/86, 150; 74/866; 364/424.1

[56] References Cited

U.S. PATENT DOCUMENTS

| 3,845,671 | 11/1974 | Sharp et al. | 475/150 |
| 4,805,486 | 2/1989 | Hagiwara et al. | 475/150 |
| 4,841,808 | 6/1989 | Ouchi et al. | 475/150 X |
| 4,872,373 | 10/1989 | Ouchi et al. | 74/866 X |

FOREIGN PATENT DOCUMENTS

| 63-184526 | 7/1988 | Japan . | |
| 81/02049 | 7/1981 | World Int. Prop. O. | 475/150 |

Primary Examiner—Dwight Diehl
Attorney, Agent, or Firm—Martin A. Farber

[57] ABSTRACT

A differential is provided between a left and a right wheels of a motor vehicle for distributing an output torque of a transmission to the left and the right wheels. A fluid operated multiple-disk clutch is provided for restricting the differential operation of the differential. A speed difference between the left and the right wheels is calculated, and an input torque to the differential is determined. The fluid operated multiple-disk clutch is operated in accordance with the speed difference and the input torque, in such a manner that the restricting magnitude increases with increases of the speed difference and the input torque.

3 Claims, 4 Drawing Sheets

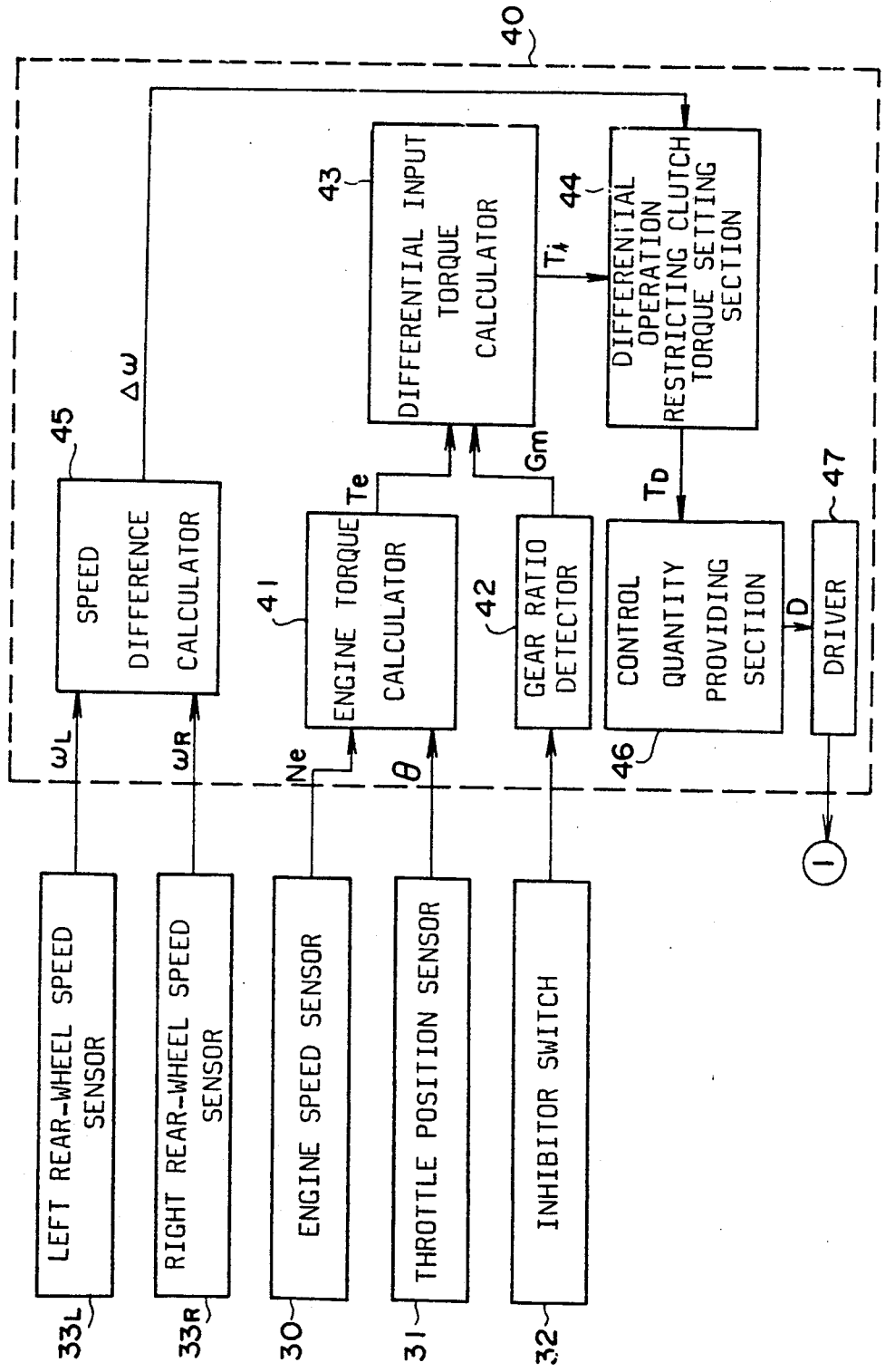

SYSTEM FOR CONTROLLING DISTRIBUTION OF TORQUE TO LEFT AND RIGHT WHEELS OF A MOTOR VEHICLE

BACKGROUND OF THE INVENTION

The present invention relates to a control system of a torque distribution to left and right driving wheels of a motor vehicle, and more particularly to the control system in which an output torque of a transmission is distributed to the left and right rear driving wheels in accordance with driving conditions of the vehicle.

The motor vehicle is provided with a differential between the left and right wheels. If an input torque to the differential is large at driving on a slippery road, the wheels are liable to slip. Accordingly, there is provided a differential operation restricting device for restricting the differential operation of the differential which is operated in response to the input torque. The restricting device previously operates to restrict the differential operation, thereby preventing the wheels from slipping. In a differential operation restricting device having a mechanical engaging device, engaging force for restricting the operation steeply increases at a predetermined input torque. Consequently, when an accelerator pedal of the motor vehicle is depressed at cornering, running behavior of the vehicle may suddenly change due to a rapid change of the engaging force. In order to solve such a problem, a fluid operated multiple-disk friction clutch has been provided. The engaging force of the clutch is continuously changed in accordance with the differential input torque, thereby smoothly controlling the differential restricting clutch torque.

Japanese Patent Application Laid-Open 63-184526 discloses such a differential operation control system. The system operates to restrict the differential operation when vehicle speed is smaller than a predetermined value in accordance with vehicle driving torque which is the differential input torque.

By the conventional system, the slipping of the wheels can be prevented to ensure driveability of the vehicle. However, since the differential restricting torque is controlled only by the differential input torque, the differential operation is largely restricted when the input torque is large. Accordingly, straight-ahead running and steering characteristics are deteriorated. In particular, when the vehicle negotiates a curve of an uphill road having a high friction coefficient, the differential operation is excessively restricted.

SUMMARY OF THE INVENTION

The object of the present invention is to provide a torque distribution control system for left and right driving wheels where a differential operation is properly controlled to improve straight-ahead running performance and steerability.

According to the present invention there is provided a system for controlling a torque distribution to a left and right wheels of a motor vehicle, having a transmission, a differential for distributing an output torque of the transmission to the left and right wheel, and a restricting device for restricting the differential operation of said differential.

The system comprises calculator means for calculating a speed difference between speeds of the left wheel and the right wheel, means for determining an input torque input to the differential and for producing a differential input torque, setting means responsive to the calculated speed difference and the differential input torque for setting a restricting force of the restricting device to a value which increases with increases of the speed difference and the differential input torque, and control means responsive to the restricting force for operating the restricting device.

Thus, when the vehicle is driven on a dry road where the speed difference is small, the restricting force is set to a small value.

The other objects and features of this invention will become understood from the following description with reference to the accompanying drawings.

BRIEF DESCRIPTION OF DRAWINGS

FIGS. 1a and 1b show a power transmission system for a four-wheel drive motor vehicle according to the present invention;

DETAILED DESCRIPTION OF THE PREFERRED EMBODIMENT

Figure 1B:
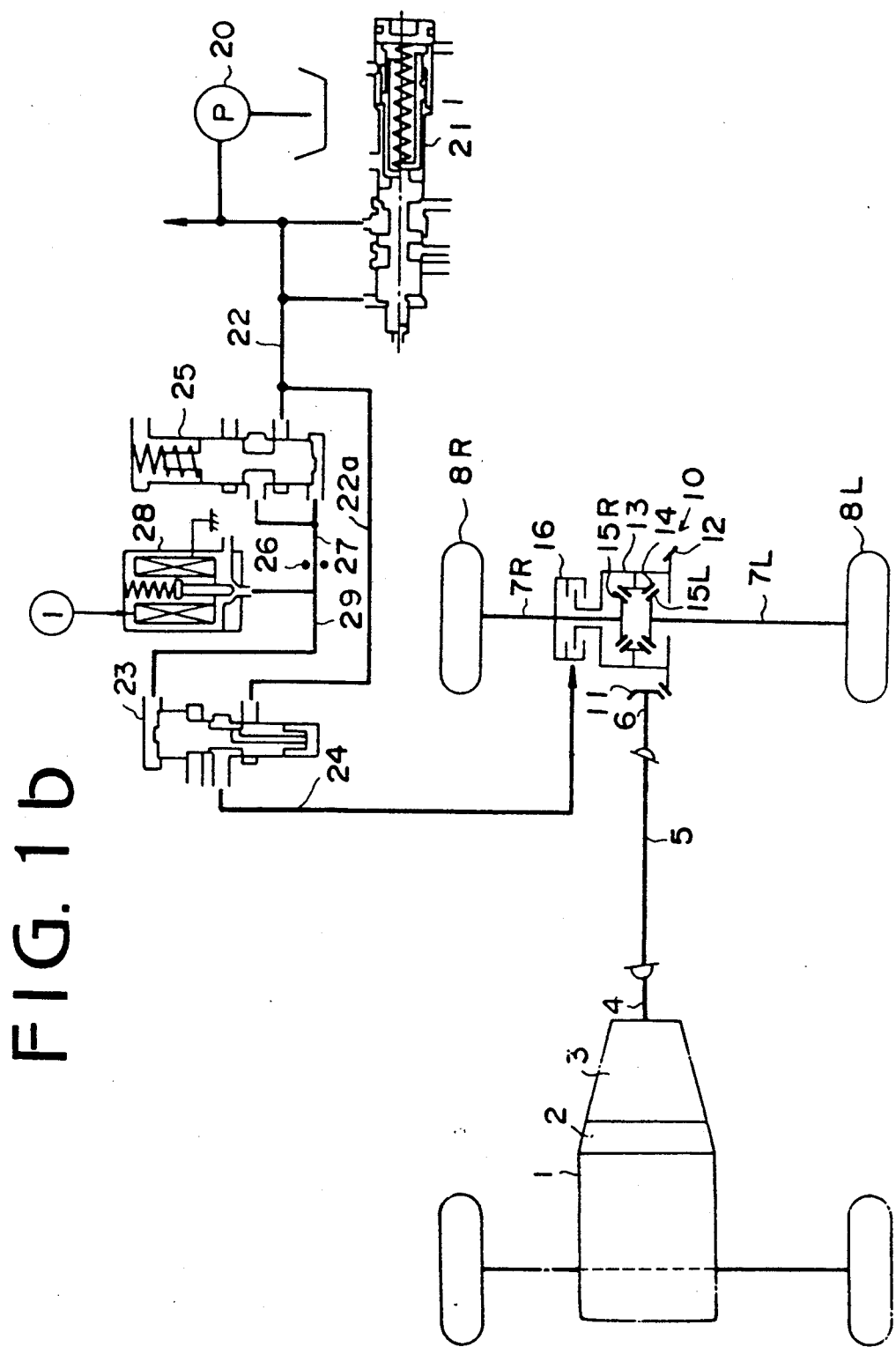

FIGS. 1a and 1b show a power transmission system for a rear-wheel drive motor vehicle with a front-mounted engine according to the present invention. An engine 1 is mounted on a front portion of the vehicle. A clutch 2 and a transmission 3 are disposed at the rear of the engine 1 in a longitudinal direction of the vehicle. An output of the transmission 3 is transmitted to an output shaft 4. The output shaft 4 is connected to a rear drive shaft 6 through a propeller shaft 5. The rear drive shaft 6 is connected to a rear differential 10 and further to left and right rear wheels 8L and 8R through axles 7L and 7R.

The rear differential 10 comprises a bevel gear differential device mounted in a differential case 13. The rear differential 10 comprises a final gear 12 integral with the case 13 and meshed with a pinion 11 secured to the drive shaft 6, a pair of differential pinions 14 rotatably mounted in the case 13, and a pair of side gears 15R and 15L meshed with the pinions 14. The side gears 15R and 15L are connected to the right and left axles 7R and 7L, respectively. A fluid operated multiple-disk friction clutch 16 is provided between the differential case 13 and the side gear 15R of the rear differential 10 for restricting the differential operation of the differential 10. The clutch torque $T_D$ of the clutch 16 is controlled in accordance with the input torque of the differential 10 for restricting the differential operation.

A hydraulic circuit of a control system for the clutch 16 comprises an oil pump 20, a pressure regulator valve 21, a pilot valve 25, a clutch control valve 23 and a solenoid operated duty control valve 28. The regulator valve 21 operates to regulate the pressure of oil supplied from the oil pump 20 driven by the engine 1 to produce a line pressure and the line pressure is applied to a line pressure conduit 22. The conduit 22 is communicated with a passage 27 through the pilot valve 25. The passage 27 is communicated with the solenoid operated duty control valve 28 at downstream of an orifice 26, and with an end of the clutch control valve 23 through a passage 29. The conduit 22 is communicated with the clutch control valve 23 through a passage 22a. The clutch control valve 23 is communicated with the clutch 16 through a passage 24. The solenoid operated valve 28 is operated by pulses from a control unit at a duty ratio determined therein, thereby controlling the drain of the oil to provide a control pressure. The control pressure is applied to the clutch control valve 23 to control the oil supplied to the clutch 16 so as to control the clutch pressure (torque) and hence the differential operation restricting clutch torque $T_D$.

The control unit 40 is supplied with output signals from an engine speed sensor 30, a throttle position sensor 31, and inhibitor switch 32, a left rear-wheel speed sensor 33L, and a right rear-wheel speed sensor 33R.

An engine speed Ne and a throttle opening degree $\theta$ from the engine speed sensor 30 and the throttle position sensor 31 are applied to an engine torque calculator 41 from which an engine torque Te is retrieved from a stored table provided therein in accordance with Ne and D. The shift position switch 32 is provided for producing a transmission range signal representing a selected gear in the transmission 3. The transmission range signal is applied to a gear ratio detector 42 where a gear ratio Gm of a selected range of the transmission is detected. The engine torque Te and the gear ratio Gm are applied to a differential input torque calculator 43. A differential input torque Ti to the rear differential 10 is calculated in accordance with the engine torque Te, the gear ratio Gm and a final gear ratio Gf as follows.

$$Ti = Te \cdot Gf$$

Figure 2:
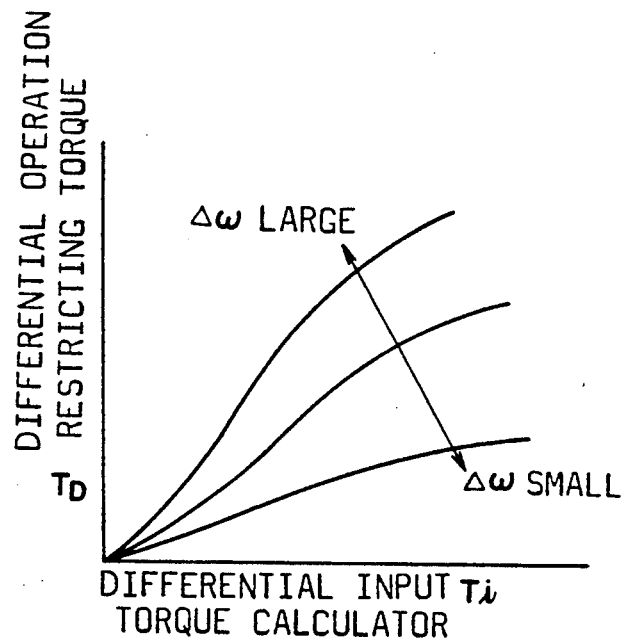
FIG. 2 is a graph showing a characteristic of differential operation restricting clutch torque corresponding to differential input torque and the difference between right-wheel speed and left-wheel speed.

The differential input torque Ti is applied to a clutch torque setting section 44 where the differential operation restricting torque $T_D$ is set in accordance with the input torque Ti. As shown in FIG. 2, the restricting clutch torque $T_D$ is controlled to be smoothly increased in accordance with the differential input torque Ti.

The control unit 40 has a speed difference calculator 45 to which a left rear-wheel speed $\omega L$ and a right rear-wheel speeds $\omega R$ from the sensors 33L and 33R are applied. In the speed difference calculator 45, a difference $\Delta \omega$ between the speed $\omega L$ and $\omega R$ is calculated as, $\Delta \omega = |\omega L - \omega R|$. Thus, the actual slipping state of the wheels is determined. The difference $\Delta \omega$ is applied to the differential operation restricting clutch torque setting section 44 to correct the clutch torque $T_D$. The restricting torque $T_D$ is corrected corresponding to the speed difference $\Delta \omega$. Namely, as shown in FIG. 2, when the speed difference $\Delta \omega$ is small in no slip state, a rise of the clutch torque $T_D$ is reduced As the speed difference $\Delta \omega$ increases, the rise of the clutch torque $T_D$ is increased.

The clutch torque $T_D$ is applied to a control quantity providing section 46 where a duty ratio D corresponding to the clutch torque $T_D$ is provided. The duty ratio D provided at the section 46 is applied to the solenoid operated duty control valve 28 through a driver 47.

Figure 3:
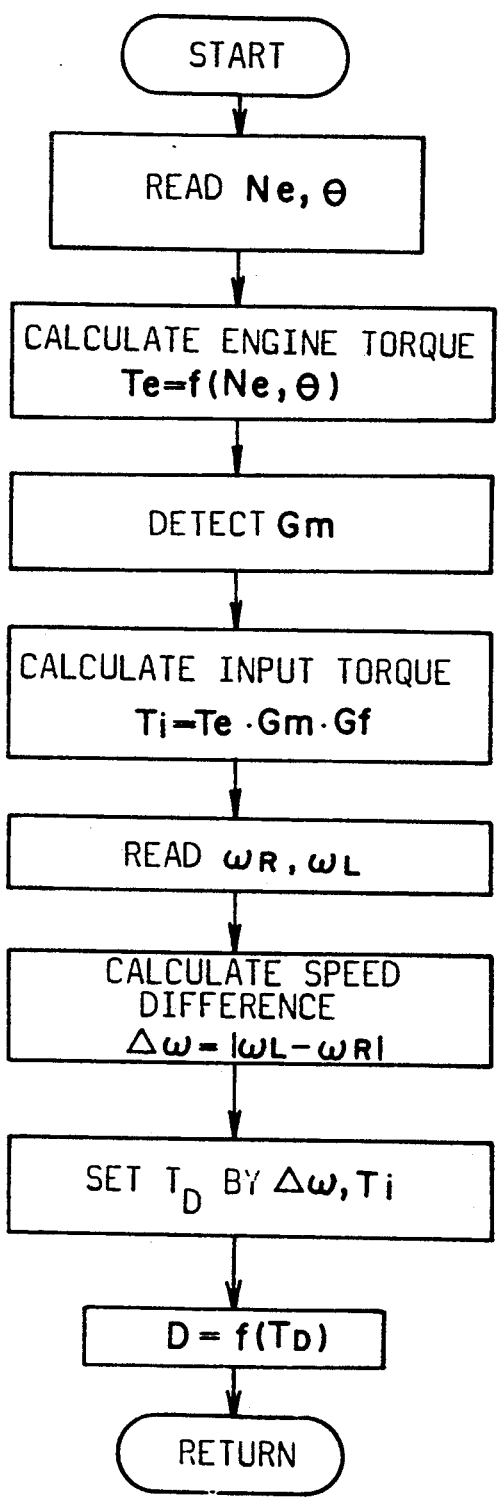
FIG. 3 is a flowchart showing the operation of a control unit in the system.

The operation of the system will be described hereinafter with reference to the flowchart of FIG. 3. The power of the engine 1 is transmitted to the transmission 3 through the clutch 2 at which the transmission ratio is controlled. The output of the transmission 3 is transmitted from the output shaft 4 to the rear differential 10 through the propeller shaft 5 and the rear drive shaft 6.

The torque is transmitted to the rear wheels 8L, 8R through the axles 7L and 7R. Thus, a two-wheel drive system is provided The engine torque Te is calculated in the engine torque calculator 41 in accordance with the engine speed Ne and the throttle opening degree $\theta$ from the engine speed sensor 30 and the throttle position sensor 31. The differential input torque Ti is calculated in the differential input torque calculator 43 based on the engine torque Te, the gear ratio Gm dependent on the input signal from the shift position switch 32 and the final gear ratio Gf. Furthermore, the differential operation restricting clutch torque $T_D$ is set in accordance with the input torque Ti at the differential operation restricting torque setting section 44.

The left rear-wheel speed $\omega L$ and the right rear-wheel speed $\omega R$ are detected by the left rear-wheel speed sensor 33L and the right-wheel speed sensor 33R. The speed difference $\Delta \omega$ is calculated in the speed difference calculator 45 for determining the slipping state of the wheels. When the input torque is large at the starting or acceleration of the vehicle, a large clutch torque $T_D$ is determined.

The differential operation restricting clutch torque $T_D$ is set at the setting section 44 by retrieving the torque $T_D$ from the look up table in accordance with the differential input torque Ti and the speed difference $\Delta \omega$ as parameters.

Furthermore, if the vehicle is driven on a slippery road and one of the left and right rear-wheels 8L, 8R slips due to the difference between the friction coefficients $\mu$ at the left and the right wheels, the speed difference $\Delta \omega$ becomes large. In such a case, the large clutch torque $T_D$ is also set. Thus, a signal having a small duty ratio D is applied to the solenoid operated valve 28. The clutch control pressure increases to operated valve 28. The clutch control pressure increases to operate the clutch valve 23, thereby opening the passage 22a. The clutch 16 is thus supplied with oil so that the clutch torque $T_D$ increases so as to restrict the differential operation of the rear differential 10. Consequently, the slip is supressed, thereby preventing the vehicle from becoming stuck. Thus, running performance of the vehicle is improved.

When the calculated difference is small owing to the high friction coefficient $\mu$ of the road, a small clutch torque is determined. A signal having a large duty ratio corresponding to the small clutch torque is applied to the solenoid operated duty control valve 28. Thus, the clutch control pressure becomes zero and the clutch control valve 23 operates to close the passage 22a, thereby draining the oil from the clutch 16. The clutch 16 is disengaged and the clutch torque $T_D$ becomes zero so as to render the rear differential 10 free. Accordingly, the torque is equally transmitted to the left rear-wheel 8L and the right rear-wheel 8R, thereby improving steerability and driving stability.

The differential input torque may be detected by a torque sensor. Furtheremore, the system of the present invention can be applied to a four-wheel drive vehicle.

In accordance with the present invention, the differential operation restricting force is controlled in accordance with the differential input torque. The restricting force is corrected based on the slip condition determined by the speed difference between the left wheel and and the right wheel. In no slip state, the restricting force is reduced to improve the straight-ahead running performance and the steerability.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a torque distribution to a left and a right wheels of a motor vehicle, having a transmission, a differential for distributing an output torque of the transmission to said left and right wheels, and a restricting device for restricting a differential operation of said differential, the system comprising:

calculator means for calculating a speed difference between speeds of said left wheel and said right wheel; means for determining an input torque input to said differential and for producing a differential input torque;

setting means responsive to the calculated speed difference and said differential input torque for setting a restricting force of said restricting device to a value which increases with an increase of said speed difference and said differential input torque; and control means responsive to said restricting force for operating said restricting device so as to accurately control said torque distribution without wheel slipping.

2. The system according to claim 1, wherein said restricting device is a fluid-operated friction clutch.

3. The system according to claim 1, wherein said differential input torque is determined in accordance with output torque of an engine of said vehicle and a gear ratio of said transmission.

* * * * *